(12) United States Patent
Lee

(10) Patent No.: US 11,800,903 B2
(45) Date of Patent: Oct. 31, 2023

(54) AIR INJECTION APPARTATUS AND FUNCTIONAL CLOTHES INCLUDING THE SAME

(71) Applicant: COVER-SOMEONE CORPORATION, Seoul (KR)

(72) Inventor: Jae Ho Lee, Seoul (KR)

(73) Assignee: COVER-SOMEONE CORPORATION, Seoul (KR)

( * ) Notice: Subject to any disclaimer, the term of this patent is extended or adjusted under 35 U.S.C. 154(b) by 570 days.

(21) Appl. No.: 16/959,629

(22) PCT Filed: Nov. 6, 2019

(86) PCT No.: PCT/KR2019/014989
§ 371 (c)(1),
(2) Date: Jul. 1, 2020

(87) PCT Pub. No.: WO2020/218696
PCT Pub. Date: Oct. 29, 2020

(65) Prior Publication Data
US 2021/0244108 A1    Aug. 12, 2021

(30) Foreign Application Priority Data

Apr. 23, 2019 (KR) .................. 10-2019-0047206
Nov. 4, 2019 (KR) .................. 10-2019-0139724

(51) Int. Cl.
*A41D 13/015* (2006.01)
*A41D 27/00* (2006.01)
*F16K 31/528* (2006.01)

(52) U.S. Cl.
CPC .......... *A41D 13/015* (2013.01); *A41D 27/00* (2013.01); *F16K 31/528* (2013.01)

(58) Field of Classification Search
CPC ... A41D 13/015; B60C 29/005; F16K 31/528; B60S 5/04
See application file for complete search history.

(56) References Cited

U.S. PATENT DOCUMENTS 1,795,340 A  *  3/1931  Larson ...................... B60S 5/04
                                                116/274
9,322,481 B2 *  4/2016  Wenchell ............... B60K 15/04
(Continued)

FOREIGN PATENT DOCUMENTS

WO    WO-2020194561 A1 * 10/2020 ........... B60C 29/002

*Primary Examiner* — Tajash D Patel
(74) *Attorney, Agent, or Firm* — Bridgeway IP Law Group, PLLC; Sang Ho Lee; Hyun Woo Shin

(57) ABSTRACT

Provided is an air injection device. The air injection device includes: a body having an air passage formed therein; and an opening and closing part coupled to one end periphery of the body and having an opening and closing protrusion protruding from an inner surface thereof toward the air passage of the body by a given length in such a manner as to open and close the air passage, wherein the opening and closing protrusion is moved in a first direction toward the body or in a second direction opposite to the first direction by means of a user's control for the opening and closing part, and the movement of the opening and closing protrusion in the first direction or in the second direction is guided by means of a guide groove formed on an outer peripheral surface of one end portion of the body and a guide protrusion formed on the inner peripheral surface of the opening and closing part in such a manner as to be inserted into the guide groove.

10 Claims, 15 Drawing Sheets

(56) References Cited

U.S. PATENT DOCUMENTS

| | | | |
|---|---|---|---|
| 11,493,139 B1* | 11/2022 | Courtney | B60C 29/005 |
| 2011/0155260 A1* | 6/2011 | Huang | F04B 33/005 |
| | | | 137/231 |
| 2014/0190576 A1* | 7/2014 | Wang | F16K 15/20 |
| | | | 137/231 |
| 2015/0165845 A1* | 6/2015 | Poertner | B60C 29/005 |
| | | | 137/231 |
| 2018/0126088 A1* | 5/2018 | Radmer | A61M 5/3158 |
| 2018/0202564 A1* | 7/2018 | Wang | F04B 33/005 |
| 2021/0246989 A1* | 8/2021 | Schuster | F16K 31/52408 |

* cited by examiner

(12) United States Patent
US 11,800,903 B2

AIR INJECTION APPARTATUS AND FUNCTIONAL CLOTHES INCLUDING THE SAME

TECHNICAL FIELD

The present invention relates to an air injection device and functional clothing having the same, and more particularly, to an air injection device and functional clothing having the same that are capable of allowing air to be easily introduced into or discharged from an air tube located at a given area of the functional clothing.

BACKGROUND ART

An air injection device is mounted on media for various purposes such as a knee brace, a body correction pad, an abdominal belt, a life vest, a rubber tube, a wrist brace, and so on to easily introduce and discharge air into and from the media.

A conventional air injection device includes an injection tube sealedly fused with an air tube in such a manner as to communicate with the air tube, a valve located inside the injection tube, and an opening and closing cap formed integrally with top end periphery of one side of the injection tube.

However, the conventional air injection device is configured to allow air to be injected through a separate manual pump in a state where the opening and closing cap fitted to the injection tube has been removed from the injection tube and, if the air injection is finished, to allow the opening and closing cap to be fitted to the injection tube again. If it is desired to discharge the air from the air tube, further, the conventional air injection device has to discharge the air from the air tube by means of a separate air adjustment pin. Accordingly, the conventional air injection device causes many inconveniences in use.

As mentioned above, the separate pump is needed to inject the air into the air tube, which causes a user's inconvenience when the air injection device is carried with him or her, and also, when the conventional air injection device is mounted on clothing or the like, also, it causes a heavy weight, thereby making him or her feel uncomfortable. As the opening and closing cap is not sealed well, moreover, the air injected into the air tube is not sealed well.

Furthermore, the air injection device is coupled to functional clothing so that the air is introduced and discharged into and from a given area of the functional clothing to provide a feeling like a cushion to the given area of the functional clothing.

However, conventional functional clothing is configured to allow a separate air tube capable of being expanded by injection of air to be built therein, thereby making a manufacturing process complicated, and to allow the air tube to be made of a different material therefrom, thereby making a user feel uncomfortable.

Accordingly, there is a definite need for development of an air injection device capable of solving the above-mentioned problems.

DISCLOSURE

Technical Problem

Accordingly, the present invention has been made in view of the above-mentioned problems occurring in the related art, and it is an object of the present invention to provide an air injection device that is capable of allowing an air passage connected to an air tube located on a given area of clothing to be open and closed by means of a simple operating way, thereby permitting air to be easily introduced into or discharged from the air tube, and to provide functional clothing having the air injection device that is capable of allowing the air tube to be formed integrally therewith.

The technical problems to be achieved through the present invention are not limited as mentioned above, and other technical problems not mentioned herein will be obviously understood by one of ordinary skill in the art through the following description.

Technical Solution

To accomplish the above-mentioned objects, according to one aspect of the present invention, there is provided an air injection device including: a body having an air passage formed therein; and an opening and closing part coupled to one end periphery of the body and having an opening and closing protrusion protruding from an inner surface thereof toward the air passage of the body by a given length in such a manner as to open and close the air passage, wherein the opening and closing protrusion is moved in a first direction toward the body or in a second direction opposite to the first direction by means of a user's control for the opening and closing part, and the movement of the opening and closing protrusion in the first direction or in the second direction is guided by means of a guide groove formed on an outer peripheral surface of one end portion of the body and a guide protrusion formed on the inner peripheral surface of the opening and closing part in such a manner as to be inserted into the guide groove.

According to the present invention, desirably, as the opening and closing protrusion is moved in the first direction, at least a portion thereof is inserted into the air passage to close the air passage.

According to the present invention, desirably, the opening and closing part includes at least one air injection hole penetratingly formed on one end periphery thereof around the opening and closing protrusion, so that as the opening and closing protrusion is moved in the second direction, the opening and closing protrusion is drawn from the air passage to open the air passage, and the air passage communicates with the outside through the air injection hole.

According to the present invention, desirably, the guide groove includes: a first guide groove formed in a longitudinal direction of the body; and a second guide groove and a third guide groove extended from both ends of the first guide groove in a circumferential direction of the body.

According to the present invention, desirably, the guide protrusion is moved along the first guide groove by means of the user's first control to allow the opening and closing protrusion to be moved in the first direction or in the second direction, and if the guide protrusion is located on one end or the other end of the first guide groove, the guide protrusion is moved along the second guide groove or the third guide groove by means of the user's second control to allow the opening and closing protrusion to be kept in a state of opening or closing the air passage.

According to the present invention, desirably, the first guide groove is formed on the outer peripheral surface of one end of the body in an oblique direction from one end of the body toward the other end of the body, and the second guide groove and the third guide groove are extended from both ends of the first guide groove toward the opposite sides to each other, so that if the opening and closing part is rotated in a first rotating direction or in a second rotating direction opposite to the first rotating direction, the guide protrusion is moved along the second guide groove, the first guide groove, and the third guide groove, sequentially to allow the opening and closing protrusion to open or close the air passage.

According to the present invention, desirably, the guide groove further includes a fourth guide groove extended from a given area of the third guide groove or from one end of the first guide groove from which the third guide groove is extended so as to separate the opening and closing part from the body.

According to the present invention, desirably, the air injection device further includes an injecting part connected to one end periphery of the opening and closing part to allow an interior thereof to communicate with the air passage at the time when the air passage is open, one end periphery of the injecting part on the opposite side to the opening and closing part having a smaller outer diameter than the opening and closing part.

According to the present invention, desirably, the air injection device further includes a first connecting part coupled to the other end of the body in such a manner as to allow the air injection device to communicate with a hose, and the first connecting part including: a coupling member formed to penetrate inside thereof and having at least a portion thereof inserted into the hose to allow the hose to communicate with the air passage; and a fixing member spaced apart from an outer peripheral surface of the coupling member to pressurize an outer peripheral surface of the hose coupled to the coupling member through coupling between the first connecting part and the body.

According to the present invention, desirably, the body has a first screw thread formed along the inner peripheral surface of the other end thereof, and the fixing member has a second screw thread formed on an outer peripheral surface thereof in such a manner as to be screw-coupled to the first screw thread of the body, so that as the first connecting part is rotated in one direction, the fixing member is coupled to the other end of the body to pressurize an outer peripheral surface of the hose.

To accomplish the above-mentioned objects, according to another aspect of the present invention, there is provided functional clothing including: the air injection device; a clothing body provided with the air injection device; an air tube located on one side of the clothing body to introduce or discharge air through the air injection device; and a hose adapted to connect the air injection device to the air tube.

According to the present invention, desirably, the air tube is formed by coating a polyurethane material onto at least a portion of an inner surface of the clothing body and by then applying thermal fusion to edges of the coated portion.

According to the present invention, desirably, the functional clothing further includes a second connector coupled to one side of the air tube to connect the air tube to the hose so that the air tube can communicate with the hose, the second connector being located on one side of the coated portion in such a manner as to be thermally fused integrally with the edges of the coated portion.

According to the present invention, desirably, at least one of the air tube and the air injection device is detachably coupled to the clothing body.

According to the present invention, desirably, at least one of the air tube and the air injection device is mounted inside the clothing body.

Advantageous Effects

According to the present invention, the air injection device is configured to allow the air passage to be open and closed by means of a simple way wherein the opening and closing part is moved and/or rotated, thereby making the air easily introduced or discharged, without any separate tool, and thus providing many conveniences in use.

In addition, the air injection device according to the present invention is configured to perform air injection by means of a simple way wherein a user blows air, so that no separate member like a pump is provided, thereby improving portability.

Further, the functional clothing according to the present invention is configured to allow a portion to be coated and thermally fused, so that the coated portion can serve as the air tube, irrespective of the material of the clothing.

Furthermore, the functional clothing according to the present invention is configured to allow the air tube to be formed integrally with the clothing itself, so that there is no need to build the air tube in the clothing at the time when the functional clothing is made, thereby making the manufacturing process simple and removing an uncomfortable feeling caused by the insertion of the air tube made of a different material from the clothing into the clothing.

Moreover, the functional clothing according to the present invention is configured to allow the air injection device and the air tube to be located inside the clothing body, thereby providing a feeling like a cushion, and if necessary, to allow the air to be discharged from the air tube to decrease a volume of the air tube, thereby improving the user's wearing comfort and activities.

Also, the functional clothing according to the present invention is configured to allow the air tube to be located on a joint portion like a neck, wrists, and other portions thereof, thereby protecting the user from fatigues or injuries caused by his or her activities.

BRIEF DESCRIPTION OF DRAWINGS

The following drawings herein illustrate embodiments of the present invention and serve to facilitate the general understanding of the scope of the present invention.

MODE FOR INVENTION

Figure 1:
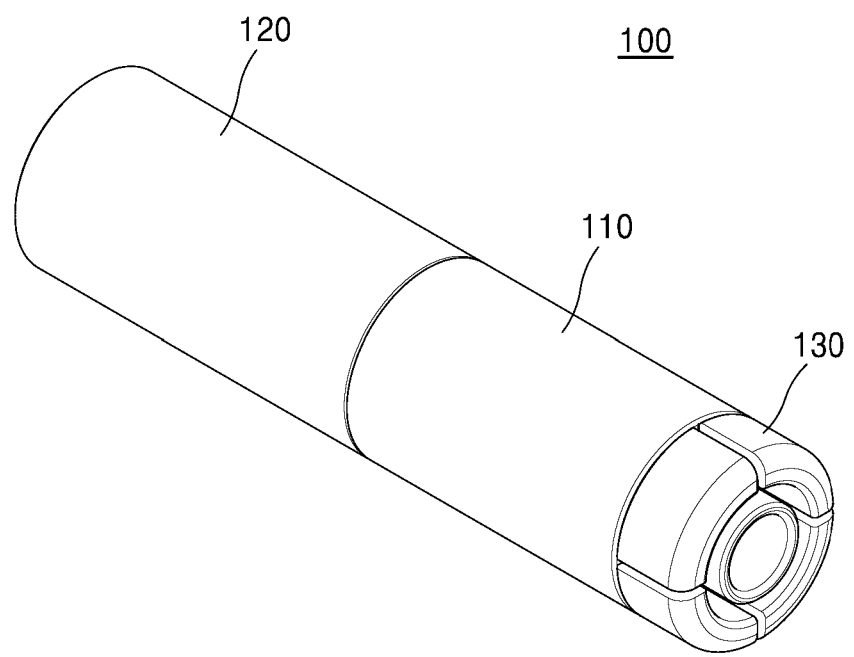
FIG. 1 is a perspective view showing an air injection device according to a first embodiment of the present invention.

Hereinafter, the present invention will be in detail explained with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description. Before the present invention is disclosed and described, it is to be understood that the disclosed embodiments are merely exemplary of the invention, which can be embodied in various forms. Further, up, down, left, and right directions as will be described below are determined with respect to the drawings, and of course, the scope of the present invention is not limited necessarily to the corresponding directions.

When it is said that one element is described as being "connected" or "coupled" to the other element, one element may be directly connected or coupled to the other element, but it should be understood that another element may be present between the two elements. In the description, when it is said that one portion is described as "includes" any component, one element further may include other components unless no specific description is suggested. Terms, such as the first, the second, A, B, (a), and (b) may be used to describe various elements, but the elements should not be restricted by the terms. The terms are used to only distinguish one element from the other element.

Figure 2:
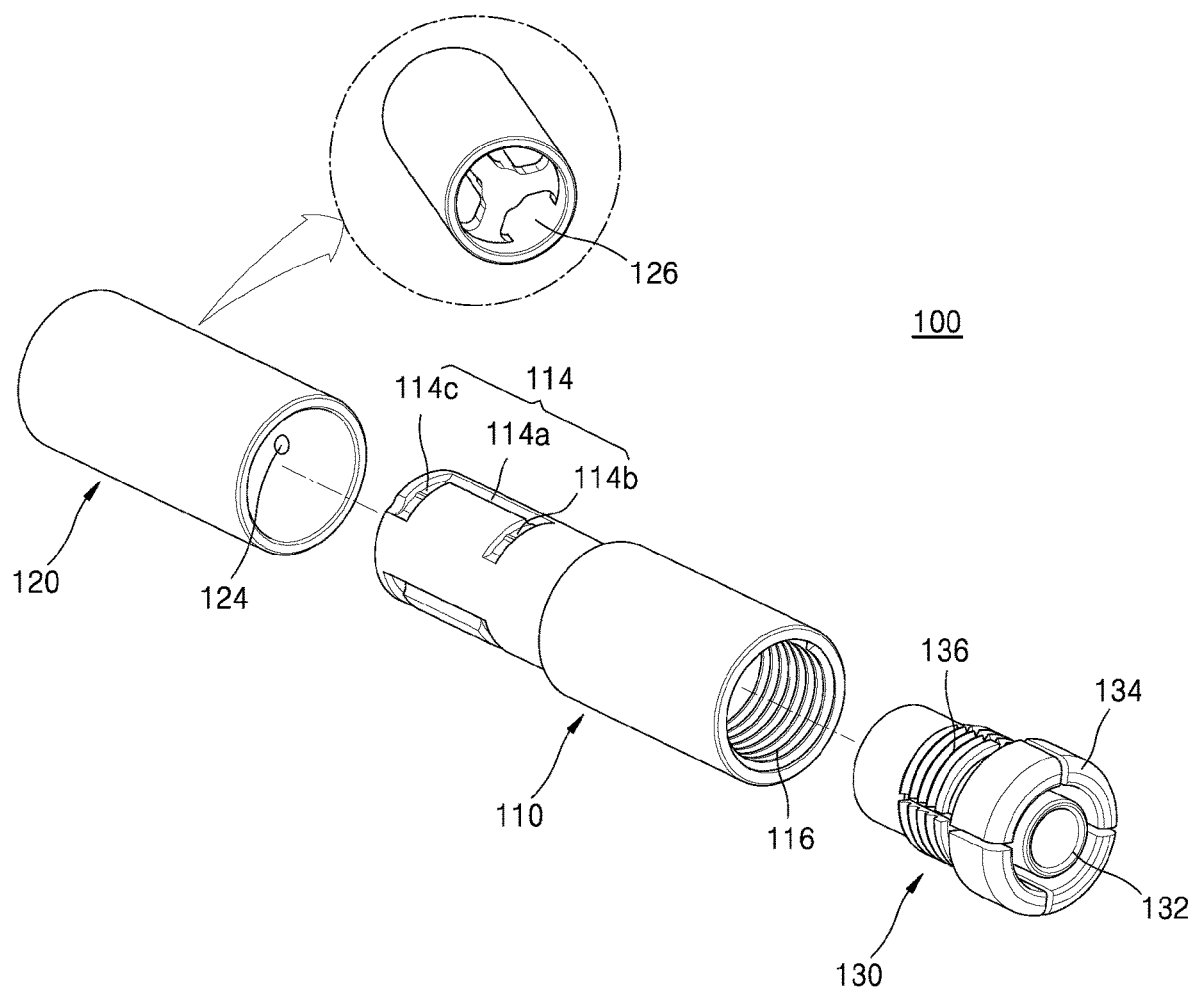
FIG. 2 is an exploded perspective view showing the air injection device according to the first embodiment of the present invention.
Figure 3:
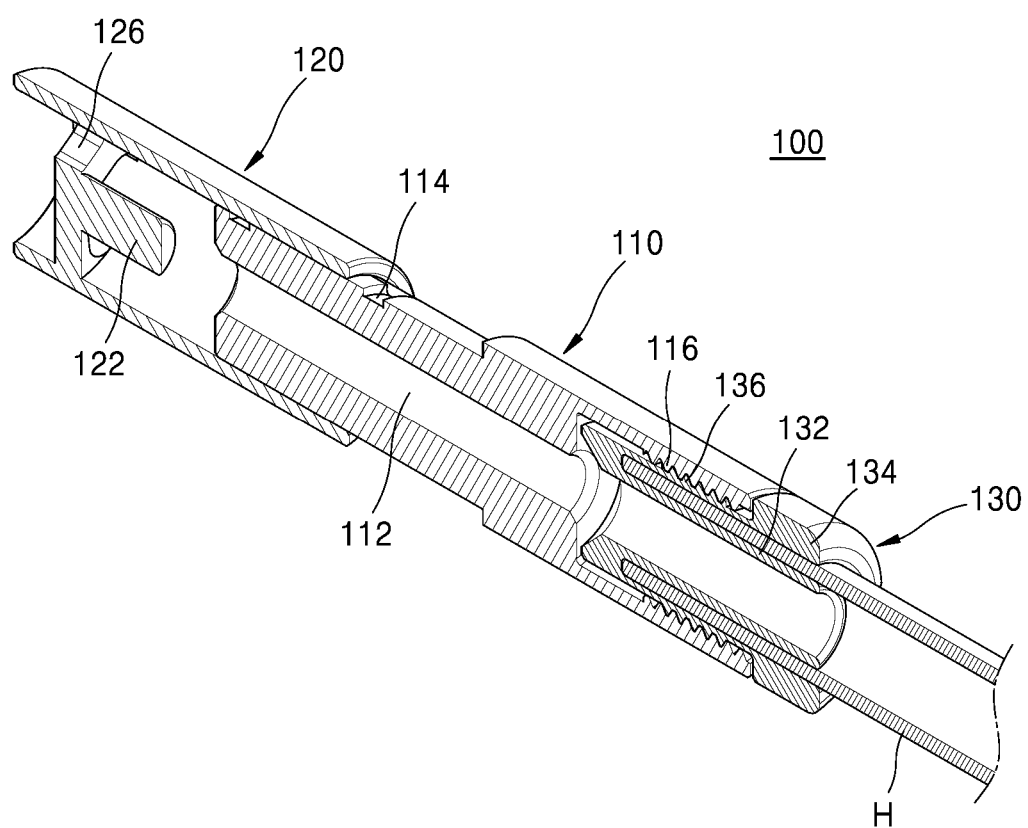
FIG. 3 is a sectional view showing the air injection device according to the first embodiment of the present invention.

FIG. 1 is a perspective view showing an air injection device according to a first embodiment of the present invention, FIG. 2 is an exploded perspective view showing the air injection device according to the first embodiment of the present invention, and FIG. 3 is a sectional view showing the air injection device according to the first embodiment of the present invention.

In this case, an air injection device 100 is a device that injects or discharges air into or from an air tube 300 located on at least a given area of a clothing body 200. In detail, the air injection device 100 communicates with the air tube 300 located on the clothing body 200 through a hose H, and the air tube 300 is expanded or contracted according to the air injected or discharged by means of the air injection device 100.

Referring to FIGS. 1 to 3, the air injection device 100 includes a body 110, an opening and closing part 120, and a connecting part 130.

The body 110 is open on both ends thereof and has an air passage 112 formed therein. Both ends of the body 110 are connected to the opening and closing part 120 and the connecting part 130, and the air passage 112 is open and closed according to a user's control for the opening and closing part 120.

The body 110 has a guide groove 114 concavely formed on an outer peripheral surface of one end thereof so as to allow the opening and closing part 120 to be coupled thereto and to guide the user's control for the opening and closing part 120, and also, the opening and closing part 120 has a guide protrusion 124 protruding from the inner peripheral surface thereof in such a manner as to be inserted into the guide groove 114.

The guide groove 114 includes a first guide groove 114a and a second guide groove 114b and a third guide groove 114c that are extended from the first guide groove 114a. For example, the first guide groove 114a is formed on the outer peripheral surface of one end of the body 110 in a longitudinal direction of the body 110, and the second guide groove 114b and the third guide groove 114c are extended from one end and the other end of the first guide groove 114a in a circumferential direction of the body 110.

Accordingly, the first guide groove 114a serves to guide the longitudinal movement of the opening and closing part 120, and the second guide groove 114b and the third guide groove 114c serve to guide the rotation of the opening and closing part 120, so that they can guide the user's control for the opening and closing part 120.

In a state where the opening and closing part 120 is coupled to the body 110, in detail, the guide protrusion 124 is moved along the first guide groove 114a by means of the user's first control, so that the opening and closing part 120 can be moved in a longitudinal direction (in a first direction toward the body 110 or in a second direction opposite to the first direction). As a result, the air passage 112 can be closed or open according to the movement of the opening and closing part 120 in the first direction or the second direction.

Further, the guide protrusion 124 is moved along the second guide groove 114b or the third guide groove 114c by means of the user's second control, so that the opening and closing part 120 can be rotated. The movement of the opening and closing part 120 in the longitudinal direction is limited or allowed according to the rotation (that is, rotating directions) of the opening and closing part 120. As the movement of the opening and closing part 120 in the longitudinal direction is limited, particularly, the air passage 112 can be kept in a closed or open state.

In this case, the first control means the control for the movement of the opening and closing part 120 in the longitudinal direction, and the second control means the control for the rotation of the opening and closing part 120. An explanation on a method for controlling the opening and closing part 120 with respect to the body 110 will be in detail given later with reference to FIGS. 5a to 5c.

According to the present invention, at least one locking protrusion (whose reference numeral is not shown) is formed on at least one region of the second guide groove 114b and the third guide groove 114c to limit the rotation of the opening and closing part 120. While the opening and closing part 120 is being rotated, for example, the guide protrusion 124 moving along the second guide groove 114b or the third guide groove 114c is locked onto the locking protrusion formed on the given region of the second guide groove 114b or the third guide groove 114c, and accordingly, the rotation of the opening and closing part 120 is limited. If a given rotating force is applied to the opening and closing part 120, however, the guide protrusion 124 is moved over the locking protrusion.

While the opening and closing part 120 is being rotated, accordingly, if the guide protrusion 124 reaches a given position, a given level of resistance is transferred to the user, and through the resistance, the user can recognize the positions and rotating degrees of the opening and closing part 120 and/or the guide protrusion 124.

According to the present invention, further, a fourth guide groove (whose reference numeral is not shown) is extended from one side of the third guide groove 114c so as to separate the body 110 from the opening and closing part 120. For example, the fourth guide groove is extended from one end portion of the third guide groove 114c in the longitudinal direction (the second direction) of the body 110, so that the guide protrusion 124 can be moved along the fourth guide groove through the user's control to allow the opening and closing part 120 to be separated from the body 110.

In this case, a limitation projection (whose reference numeral is not shown) is formed on one side of the fourth guide groove to limit the escape of the opening and closing part 120, thereby preventing the body 110 from being arbitrarily separated from the opening and closing part 120. For example, the fourth guide groove is extended from the third guide groove 114c, but it is greater in height than the third guide groove 114c in the circumferential direction of the body 110, so that the limitation projection is formed on a portion where the fourth guide groove is connected to the third guide groove 114c.

If the guide protrusion 124 is located on one end portion of the third guide groove 114c, accordingly, the guide protrusion 124 comes into contact with the limitation projection, so that it is not immediately moved to the fourth guide groove, thereby limiting the separation of the opening and closing part 120 from the body 110. If a given external force is applied to the opening and closing part 120, however, the guide protrusion 124 escapes from the limitation projection and moves along the fourth guide groove, thereby allowing the opening and closing part 120 to be separated from the body 110.

So as to allow the body 110 to be coupled to the connecting part 130, further, the body 110 has a first screw thread 116 formed along the inner peripheral surface of the other end thereof.

The opening and closing part 120 is coupled to one end portion of the body 110 and is moved in a longitudinal direction of the air injection device 100 by means of the use's control, thereby opening and closing the air passage 112 of the body 110. To do this, the opening and closing part 120 has an opening and closing protrusion 122 protruding from the inner surface of one end thereof toward the body 110.

As the opening and closing part 120 and the opening and closing protrusion 122 are moved in the first direction toward the body 110 or in the second direction opposite to the first direction by means of the user's control, in detail, the opening and closing protrusion 122 is inserted into the air passage 112 or drawn from the air passage 112, thereby closing or opening the air passage 112 of the body 110. The opening and closing protrusion 122 has a size corresponding to an inner diameter of the air passage 112 so as to tightly close the air passage 112.

According to the present invention, the opening and closing part 120 has at least one air injection hole 126 penetratingly formed therein around the opening and closing protrusion 122. If the opening and closing protrusion 122 is drawn from the air passage 112, the air passage 112 can communicate with the outside through the air injection hole 126, so that through the air injection hole 126, air is injected into the air tube 300 or air remaining in the air tube 300 is discharged to the outside.

The connecting part 130 is coupled to the other end of the body 110 in such a manner as to communicate with the body 110 and the opening and closing part 120. Further, the connecting part 130 is connected to one end periphery of the hose H to allow the air injection device 100 to communicate with the air tube 300. To do this, the connecting part 130 includes a coupling member 132 and a fixing member 134.

The coupling member 132 is formed to penetrate an interior thereof, and at least a portion of the coupling member 132 is inserted into the hose H, so that an interior of the connecting part 130 can communicate with the hose H.

The fixing member 134 is spaced apart from an outer peripheral surface of the coupling member 132 by a given distance in such a manner as to surround the outer peripheral surface of the coupling member 132, while pressurizing an outer peripheral surface of the hose H coupled to the coupling member 132 to prevent the hose H from escaping from the coupling member 132. The fixing member 134 has a second screw thread 136 formed on an outer peripheral surface thereof in such a manner as to correspond to the first screw thread 116, thereby allowing the connecting part 130 to be screw-coupled to the body 110.

If the coupling member 132 is inserted into the hose H, accordingly, one end periphery of the hose H is located at a gap between the coupling member 132 and the fixing member 134, and as the body 110 is screw-coupled to the outer peripheral surface of the fixing member 134, the outer peripheral surface of one end portion of the hose H is pressurized in a direction vertical with respect to a center axis of the air injection device 100, thereby preventing the hose H from being arbitrarily separated from the coupling member 132.

The air injection device 100 as shown in FIGS. 1 to 3 is just exemplary, and accordingly, it can be configured freely according to embodiments of the present invention. For example, the connecting part 120 and the body 110 are formed integrally with each other, and otherwise, at least one of the body 110, the opening and closing part 120, and the connecting part 130 is changed in position.

Figure 4A:
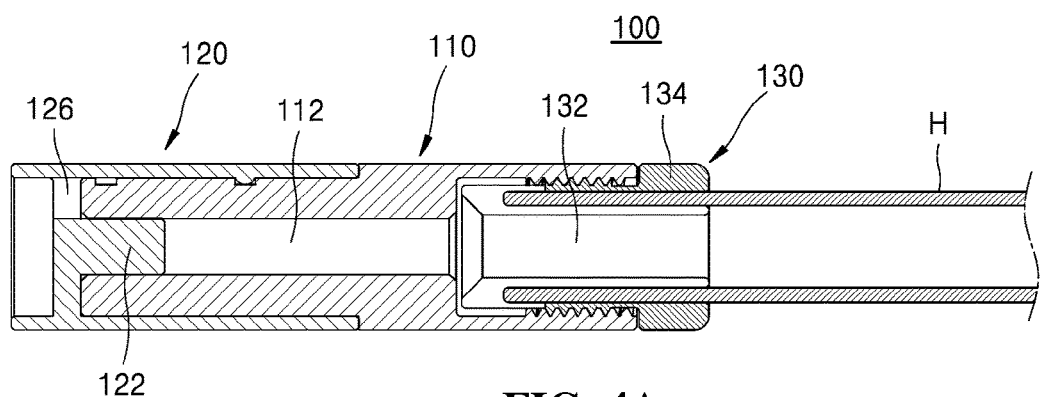
FIGS. 4A and 4B are sectional views showing operating states of the air injection device according to the first embodiment of the present invention.
Figure 4B:
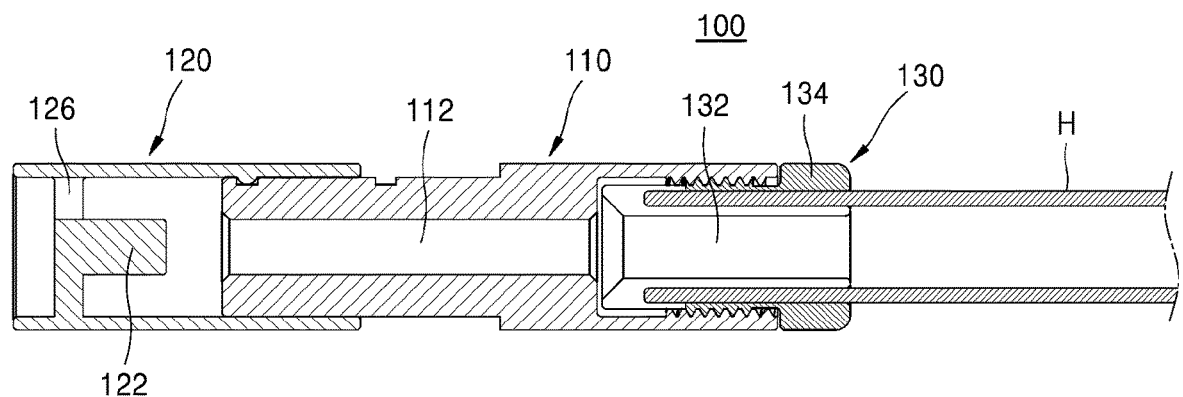

FIGS. 4a and 4b are sectional views showing operating states of the air injection device according to the first embodiment of the present invention.

FIG. 4a shows a state where the air passage 112 of the air injection device 100 is closed, and FIG. 4b shows a state where the air passage 112 of the air injection device 100 is open.

As shown in FIG. 4a, first, the opening and closing part 120 is moved in the first direction toward the body 110 by means of the user's control to allow the opening and closing protrusion 122 to be inserted into the air passage 112, and as the opening and closing part 120 is rotated in one direction, in this case, the guide protrusion 124 is located on the second guide groove 114b to allow the opening and closing protrusion 122 to be kept in a state of being inserted into the air passage 112. If the air injection device 100 is not used, accordingly, the air passage 112 is closed to prevent air from being discharged from the air tube 300.

As shown in FIG. 4b, in the state where the air passage 112 is closed, the opening and closing part 120 is rotated in the other direction opposite to one direction, and accordingly, the guide protrusion 124 is located on the first guide groove 114a, thereby allowing the opening and closing part 120 to be moved in the longitudinal direction. Next, the opening and closing part 120 is controlled by the user to open the air passage 112 of the air injection device 100, and accordingly, the opening and closing part 120 is moved in the second direction opposite to the first direction to allow the opening and closing protrusion 122 from being drawn from the air passage 112. As the opening and closing part 120 is rotated in one direction, in this case, the guide protrusion 124 is located on the third guide groove 114c to allow the opening and closing protrusion 122 to be kept in a state of being drawn from the air passage 112. Accordingly, the hose H communicates with the air injection hole 126 to allow external air to injected or discharged into or from the air tube 300.

Figure 5A:
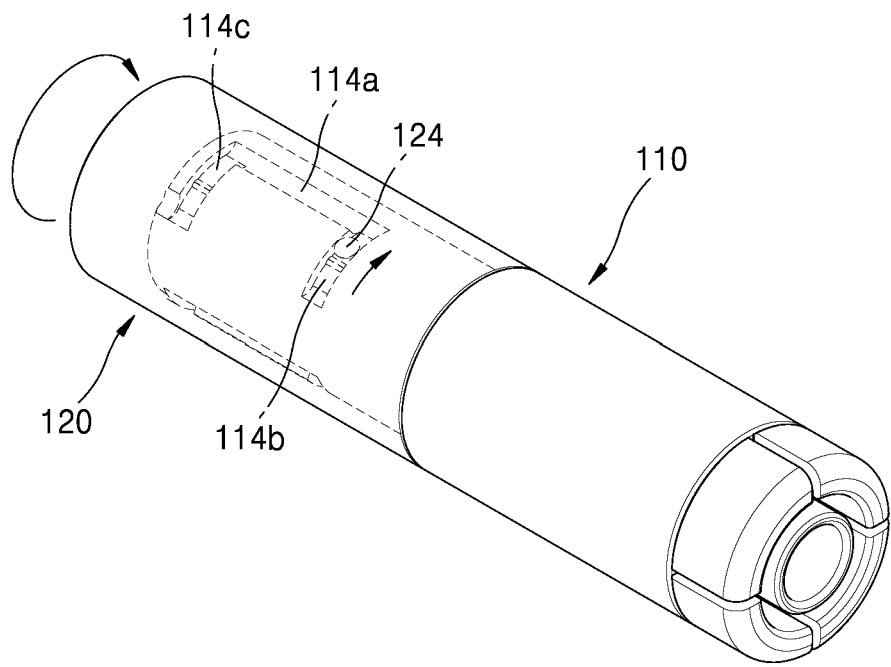
FIGS. 5A to 5C are perspective views showing operating methods of the air injection device according to the first embodiment of the present invention.
Figure 5B:
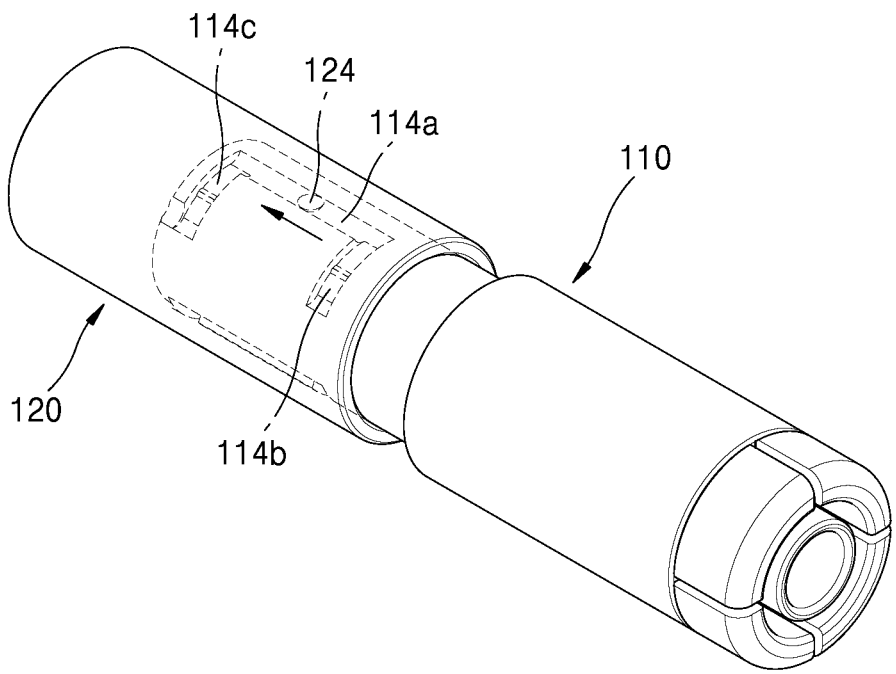
Figure 5C:
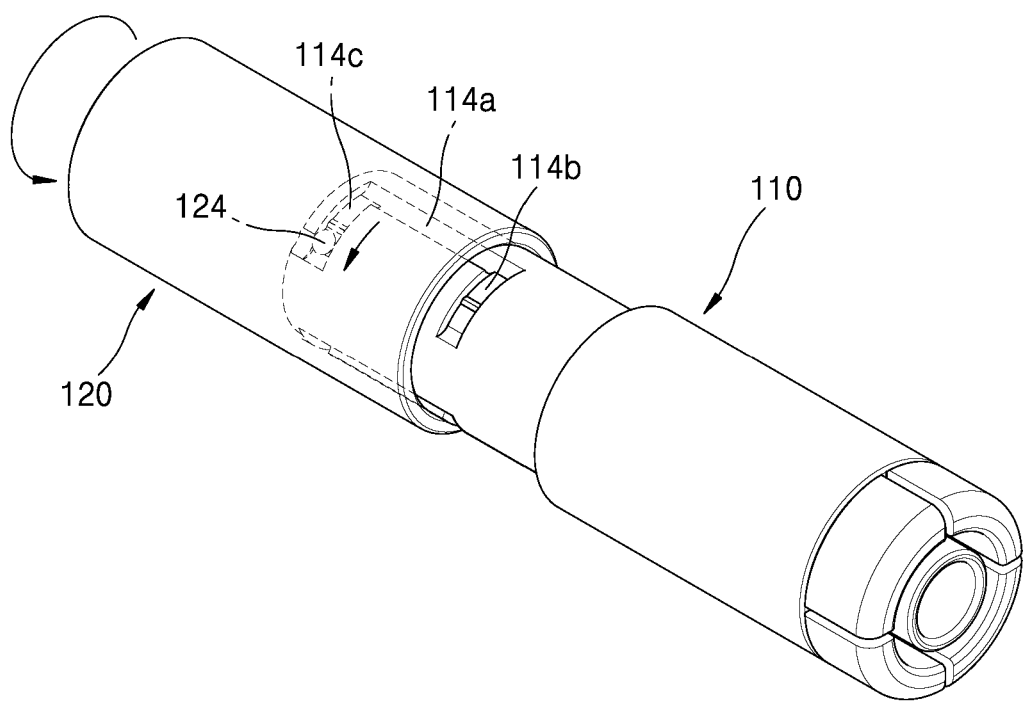

FIGS. 5a to 5c are perspective views showing operating methods of the air injection device according to the first embodiment of the present invention.

Referring first to FIG. 5a, in the state where the opening and closing part 120 is moved in the first direction (that is, toward the body 110) to allow the air passage 112 to be closed, the guide protrusion 124 is located on the second guide groove 114b to prevent the opening and closing part 120 from being moved in the longitudinal direction thereof, so that the opening and closing protrusion 122 is kept in the state of being inserted into the air passage 112. After that, if it is desired to open the air passage 112, the opening and closing part 120 is rotated in one direction (for example, clockwise direction), and accordingly, the guide protrusion 124 is moved along the second guide groove 114b, then escapes from the second guide groove 114b, and is finally located on one end of the first guide groove 114a.

Referring next to FIG. 5b, if the guide protrusion 124 is located on the first guide groove 114a, the opening and closing part 120 can be moved in the longitudinal direction thereof by means of the user's control. As shown in FIG. 5b, if the opening and closing part 120 is moved in the second direction (that is, the direction opposite to the first direction), the guide protrusion 124 is moved along the first guide groove 114a, and accordingly, the guide protrusion 124 is drawn from the air passage 124, thereby opening the air passage 112.

Referring to FIG. 5c, if the opening and closing part 120 is continuously moved in the second direction by means of the user's control, the guide protrusion 124 is moved along the first guide groove 114a and is then located at the other end portion of the first guide groove 114a. If the guide protrusion 124 is located on the other end portion of the first guide groove 114a, the movement of the opening and closing part 120 in the second direction is limited, and in this case, if the opening and closing part 120 is rotated in the other direction (for example, counterclockwise direction) opposite to one direction by means of the user's control, the guide protrusion 124 is moved along the third guide groove 114c. Accordingly, the guide protrusion 124 is located on the third guide groove 114c to prevent the opening and closing part 120 from being moved in the longitudinal direction thereof, thereby allowing the air passage 112 to be kept in an open state.

The operations of the air injection device 100 are just exemplary, and of course, they can be changed freely according to embodiments of the present invention through one having ordinary skills in the art.

Figure 6A:
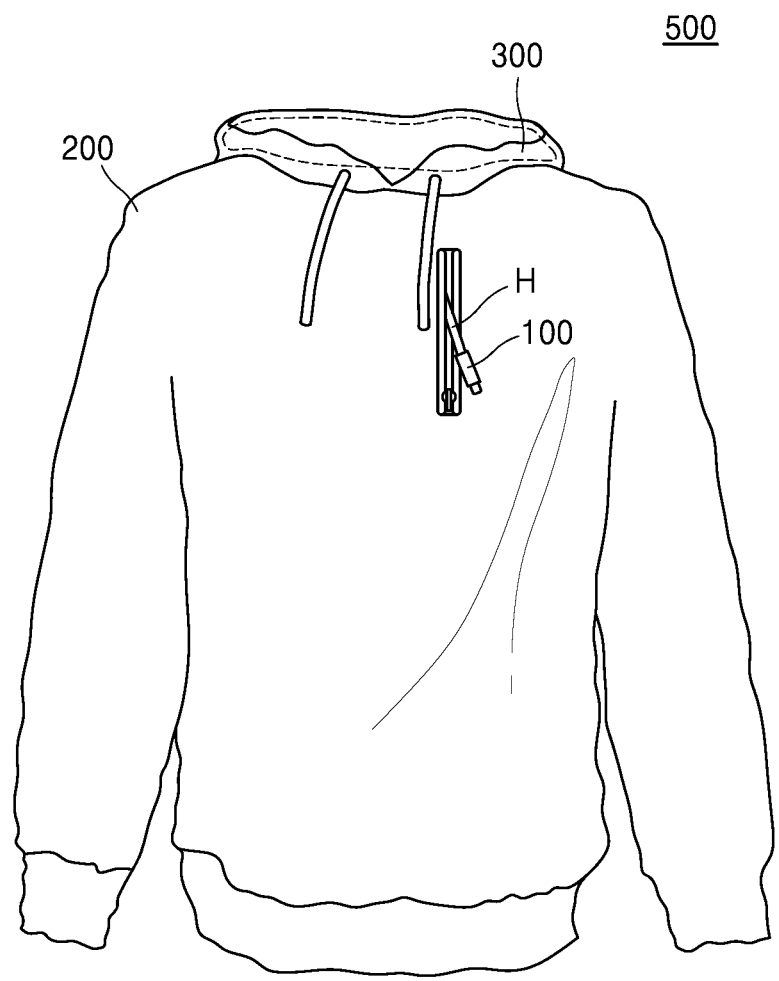
FIGS. 6A and 6B show functional clothing according to the present invention.
Figure 6B:
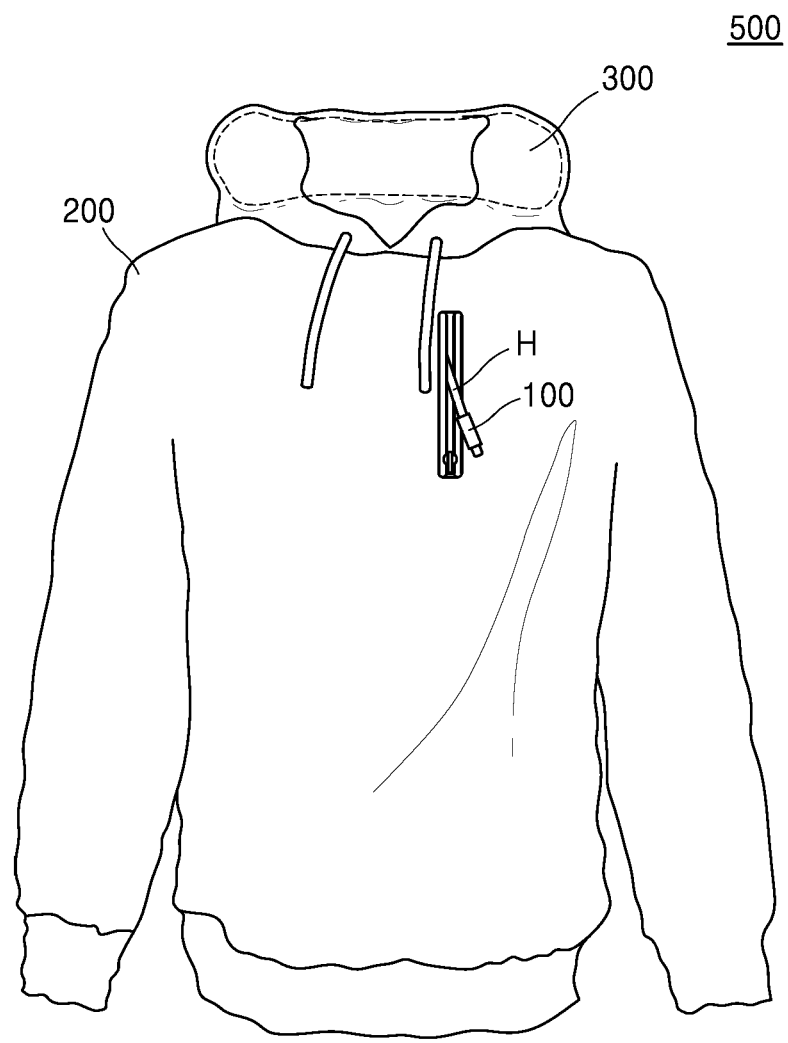

FIGS. 6a and 6b show functional clothing according to the present invention.

In detail, FIG. 6a shows functional clothing 500 in which air is discharged from the air tube 300, and FIG. 6b shows the functional clothing 500 in which air is introduced into the air tube 300.

Referring to FIGS. 6a and 6b, the functional clothing 500 includes the air injection device 100, the clothing body 200, the air tube 300, and the hose H.

The clothing body 200 has a shape of upper or lower clothing capable of being worn on the user, and of course, it may include all types of clothing or accessories capable of worn on the user, without being limited thereto.

The air tube 300 is located on one side of the clothing body 200. The air injection device 100 is detachably coupled to the air tube 300 to introduce or discharge air into or from the air tube 300. Accordingly, the air tube 300 introduces or discharges the air through the air injection device 100 and provides a feeling like a cushion to one area of the clothing body 200.

According to the present invention, as shown in FIGS. 6a and 6b, the air tube 300 is located on an area corresponding to the user's neck, but it may be located on joint portions such as wrists, knees, and so on or various areas required to absorb external impacts or to support the user's posture. As the air tube 300 is expanded with the air introduced through the air injection device 100, accordingly, the air tube 300 applies an expansion force to one area of the functional clothing 500, like a cushion, to protect the user from fatigues or injuries caused by his or her activities. Further, the air is discharged from the air tube 300 if necessary, thereby improving the user's wearing comfort or activities.

So as to perform the air communication with the air tube 300, the air injection device 100 and the air tube 300 are connected to each other by means of the hose H. In detail, one end periphery of the hose H is connected to the connecting part 130 of the air injection device 100, and the other end periphery of the hose H is connected to the air tube 300, so that the air injection device 100 can communicate with the air tube 300. Through the control of the opening and closing part 120, the air passage 112 of the air injection device 100 is open or closed. If the air passage 112 is open, air blows by the user from the air injection hole 126 of the opening and closing part 120 into the air tube 300 through the air passage 112, and otherwise, air is discharged from the air tube 300 to the opening and closing part 120. If the air passage 112 is closed, contrarily, the air tube 300 can be kept in the state where the air is introduced or discharged thereinto or therefrom.

According to the present invention, further, the hose H is connected to a connector 400 coupled to the air tube 300. This will be in detail explained later with reference to FIG. 7.

According to the present invention, as at least a portion of the clothing body 200 is coated, the air tube 300 is formed integrally with the clothing body 200. For example, polyurethane coating (PU coating) is performed by applying a polyurethane material to at least a portion of an inner surface of the clothing body 200, by performing thermal fusion on edges of the coated area, and by sealing the portion of the inner surface of the clothing body 200. However, the coating is not limited to the polyurethane coating, and it may be performed with a variety of materials. For example, the coating may be performed with a polyethylene material or a combination of polyurethane and polyethylene.

In detail, the functional clothing 500 according to the present invention is configured to allow the air tube 300 to be formed integrally with the clothing body 200 in such a manner as to be coated on the given area of the clothing body 200 to seal the portion surrounding the coated area and to thus form a space inside the clothing body 200, into which air is introduced. Especially, coating is performed onto the clothing body 200 itself so as to prevent air from permeating through a fabric constituting the clothing body 200, and accordingly, the air in the air tube 300 is prevented from being discharged to the outside. As a result, the functional clothing 500, which is formed integrally with the air tube 300, can be manufactured more efficiently, irrespective of a material of the clothing body 200.

According to the present invention, further, the air tube 300 is detachably mounted inside or outside the clothing body 200.

Test Example—Physical Property Measurement Test

A physical property measurement test was carried out for two same fabrics, that is, one fabric onto which polyurethane is coated according to the present invention and the other fabric onto which no coating is performed according to a comparison example. The physical property measurement test was largely divided into mechanical tests and functionality tests.

For the mechanical tests, first, a tensile strength test (KS K 0642,8.14.1, grab method) was carried out to check a resistance to a force of pulling a fabric, a tearing strength test (KS K 0642,8,17.4, pendulum method) to check a force necessary to tear a fabric, a bursting strength test (KS K ISO 13938-1, oil pressure method) to check a strength until a fabric bursts with a pressure applied vertically thereto, a peel strength test (KS K 0533) to check a resistance to peel of a fabric, an elastic recovery test (KS K 0541) to check a degree of recovery for a fabric extended by an external force, and an air permeability test (KS K ISO 9237) to check a degree of air permeability into spaces (pores) of a fabric.

For the functionality tests, next, a hydrostatic resistance test (KS K ISO 811, hydraulic method) was carried out to check a resistance of a fabric to water leakage or wetting, a thermal resistance test (KS K 0466) to check an amount of power necessary to maintain a temperature of a fabric when a temperature difference occurs between two surfaces of the fabric, and a water vapor permeability test (KS K 0594, calcium chloride method) to check a degree of water vapor permeability of a fabric. Results of the mechanical tests and the functionality tests are as follows.

TABLE 1

| Test Items | | The present invention | Comparison Example |
|---|---|---|---|
| Tensile strength (N) | Wale | 235.1 | 237.4 |
| | Course | 197.8 | 157.4 |
| Tearing strength (N) | Wale | 31.6 | 18.9 |
| | Course | 28.7 | 21.6 |
| Bursting strength (kPs) | | 418 | 629 |
| Peel strength (N/5.1 cm) | | 35 | — |
| Elastic recovery (%) | Wale | 90 | 90 |
| | Course | 90 | 90 |
| Air permeability (mm/s) | | 0.0 | 763.6 |
| Hydrostatic resistance (cmH$_2$0) | | 730 | 12.3 |
| Thermal resistance (clo) | | 0.092 | 0.165 |
| water vapor permeability (g/m$^2$ · 24 h) | | 888 | 9793 |

As appreciated from the test results, it can be checked that the fabric according to the present invention and the fabric according to the comparison example have similar physical properties in the tensile strength, tearing strength, bursting strength, peel strength, and elastic recovery, but it can be also checked that the fabric according to the present invention has more excellent water and/or vapor permeability than the fabric according to the comparison example.

Especially, the fabric according to the present invention has air permeability of 0.0 mm/s, which is remarkably excellent when compared with the fabric according to the comparison example. In detail, it can be appreciated that no air is permeated at all into the fabric according to the present invention. As described above, accordingly, the polyurethane is coated onto the given portion of the clothing body 200 to allow the air tube 300 to be formed integrally with the clothing body 200, and the air introduced into the air tube 300 can be prevented from being discharged to the outside.

Figure 7:
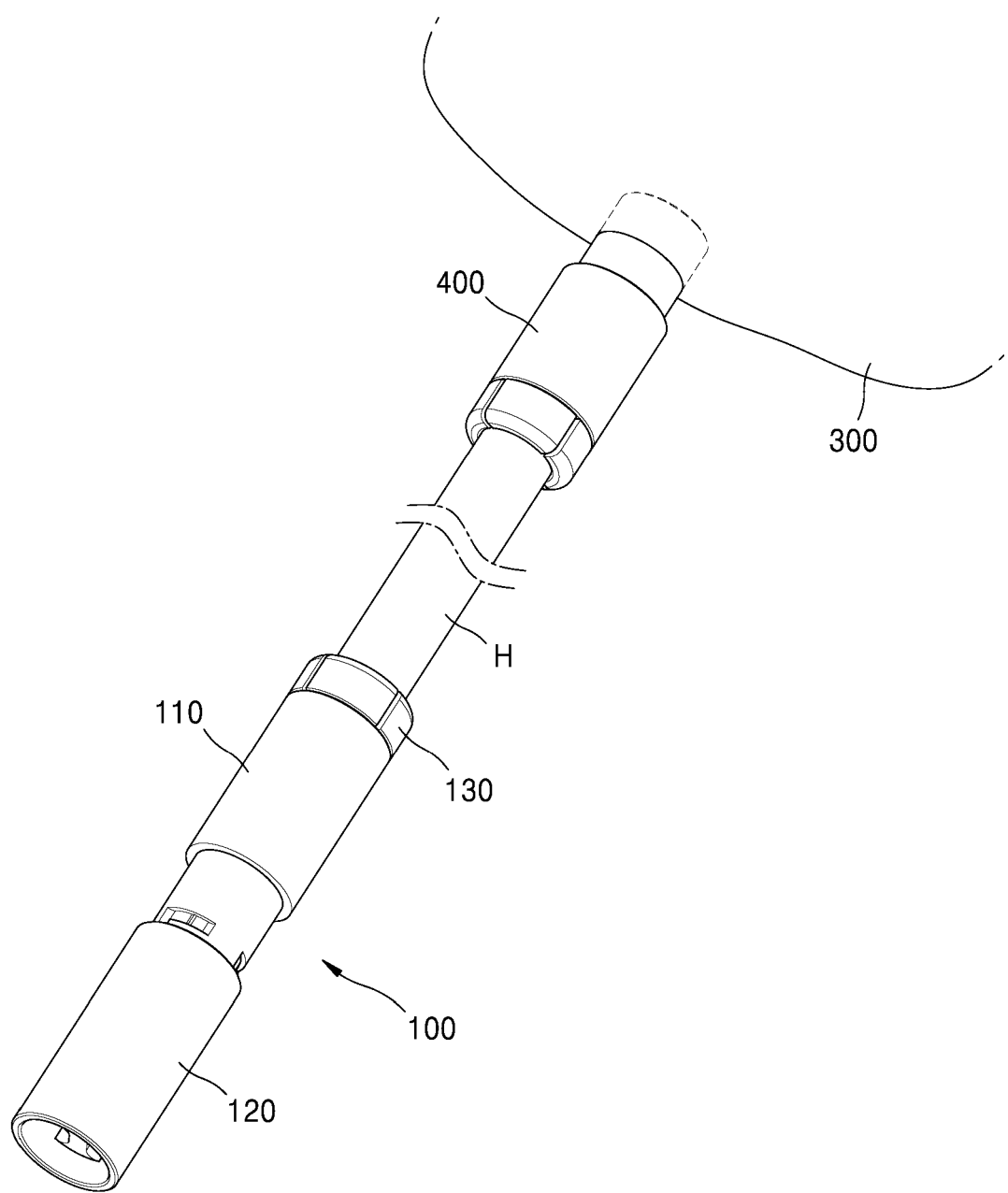
FIG. 7 is a perspective view showing a state where the air injection device is connected to the air tube in the functional clothing according to the present invention.

FIG. 7 is a perspective view showing a state where the air injection device is connected to the air tube in the functional clothing according to the present invention.

As shown in FIG. 7, the functional clothing 500 further includes the connector 400 adapted to connect the air tube 300 to the hose H. For example, the connector 400 is coupled to one side of the air tube 300, and one end of the hose H is connected to the connector 400, so that the air tube 300 can communicate with the hose H. In this case, the other end of the hose H connected to the connector 400 is connected to the connecting part 130 of the air injection device 100, so that the air injection device 100 can communicate with the air tube 300.

According to the present invention, the connector 400 is thermally fused with the clothing body 200 as an integral body in a process of forming the air tube 300 and is thus coupled to the air tube 300. For example, the connector 400 is located at a given area of the clothing body 200, onto which the polyurethane is coated, and in a process where the edges of the coated given area are thermally fused, the connector 400 is thermally fused with one edge, so that the connector 400 is coupled integrally with the air tube 300 in a state where at least a portion thereof is inserted into the air tube 300.

According to the present invention, further, the connector 400 is configured to have a structure corresponding to the connecting part 130 of the air injection device 100. Like the connecting part 130 of the air injection device 100, for example, the connector 400 includes a coupling member (whose reference numeral is not shown) and a fixing member (whose reference numeral is not shown) spaced apart from the outer peripheral surface of the coupling member, and if at least a portion of the coupling member of the connector 400 is inserted into the hose H, one end periphery of the hose H is located between a gap between the coupling member and the fixing member of the connector 400, so that the connector 400 can communicate with the hose H. However, the structure of the connector 400 is just one exemplary, and it may be freely changed according to embodiments of the present invention.

Figure 8:
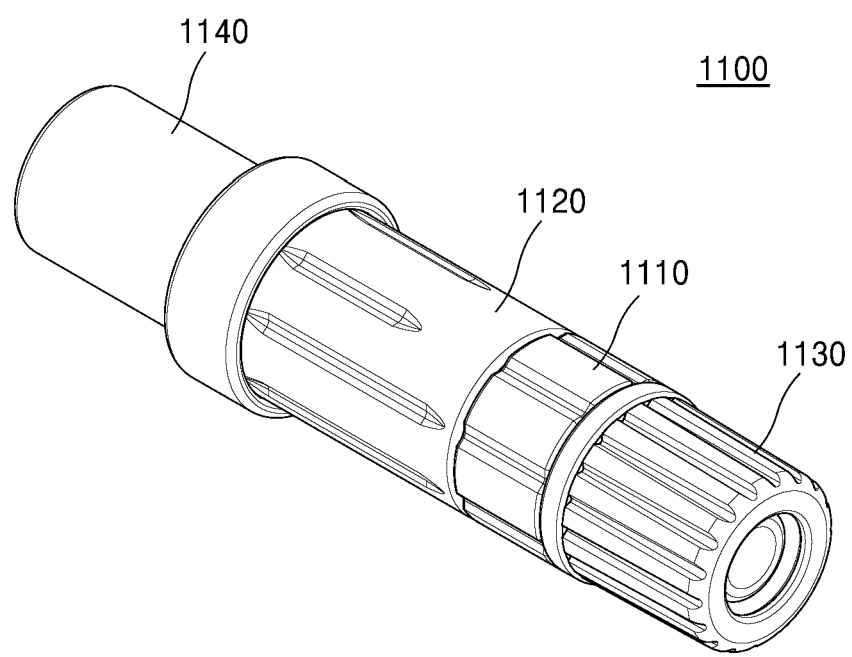
FIG. 8 is a perspective view showing an air injection device according to a second embodiment of the present invention.
Figure 9:
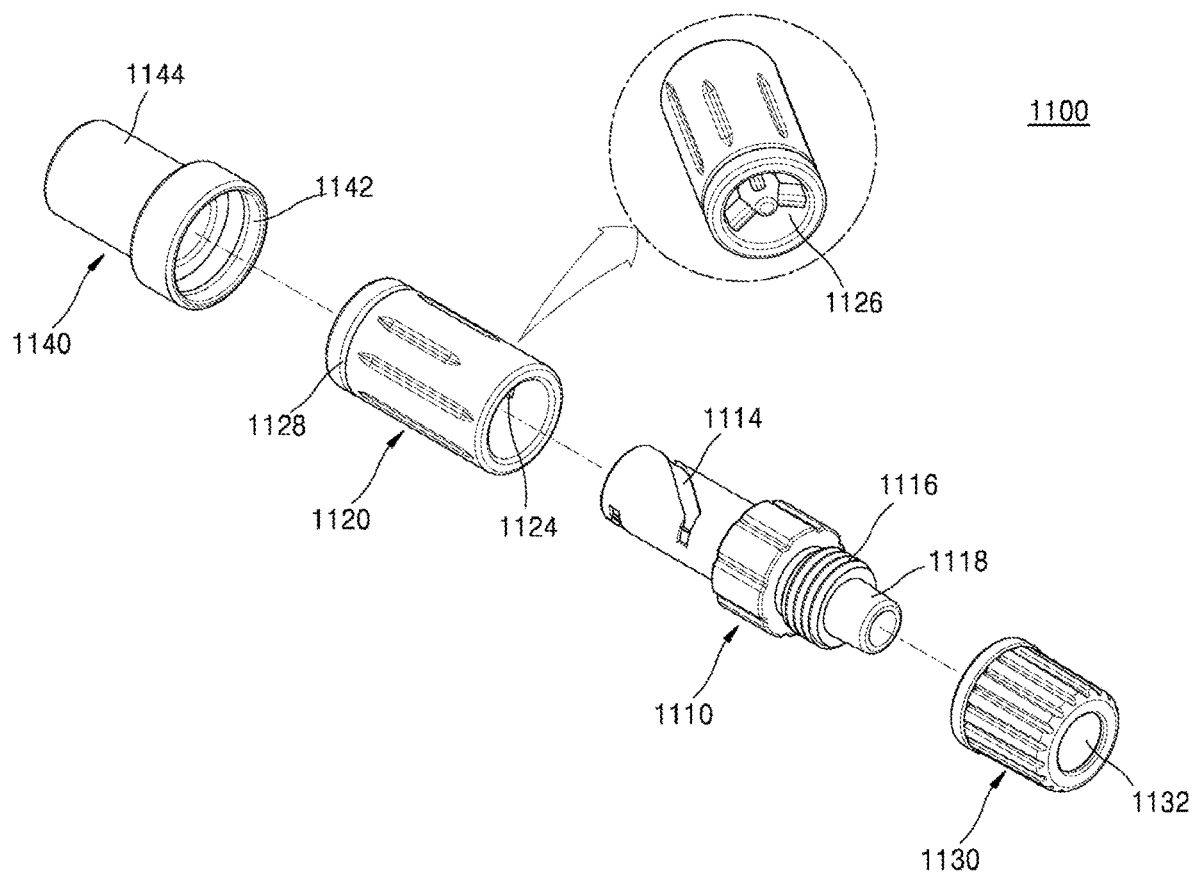
FIG. 9 is an exploded perspective view showing the air injection device according to the second embodiment of the present invention.
Figure 10:
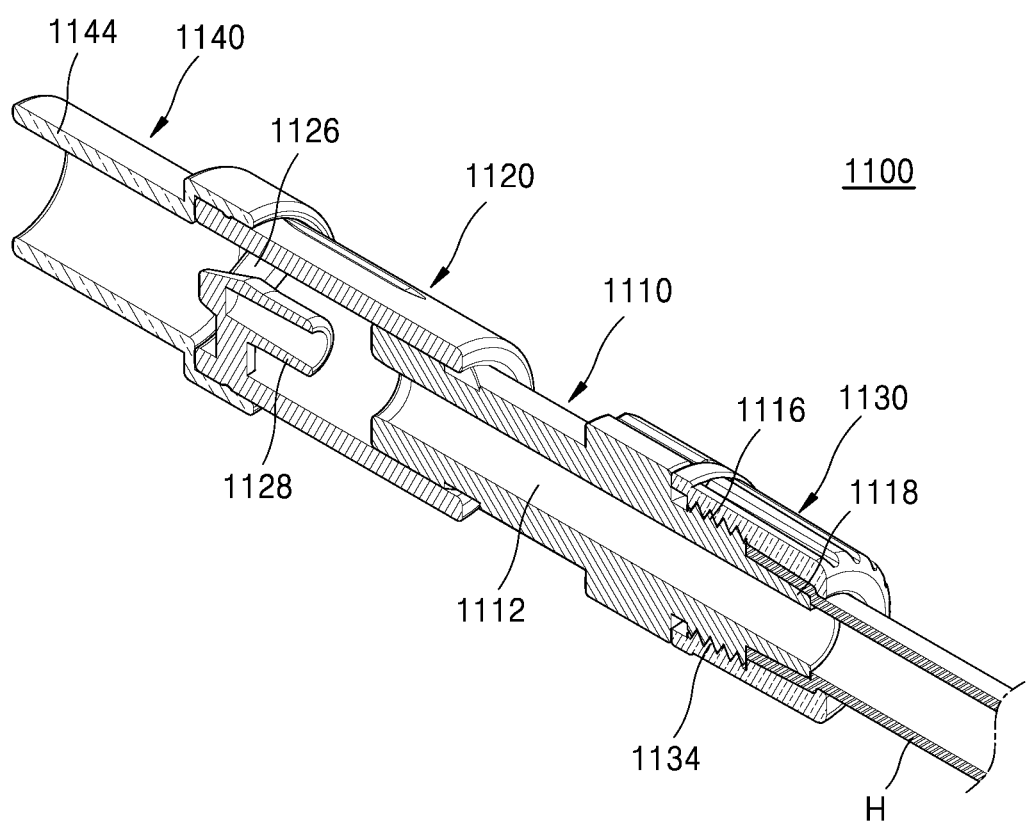
FIG. 10 is a sectional view showing the air injection device according to the second embodiment of the present invention.
Figure 11A:
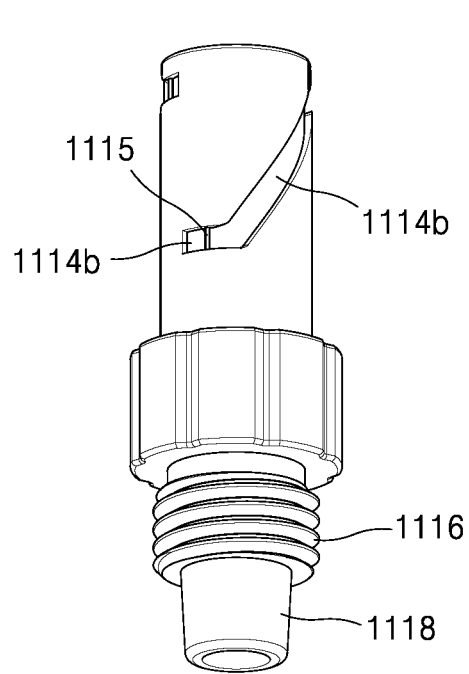
FIGS. 11A and 11B are perspective views showing a body of the air injection device according to the second embodiment of the present invention.
Figure 11B:
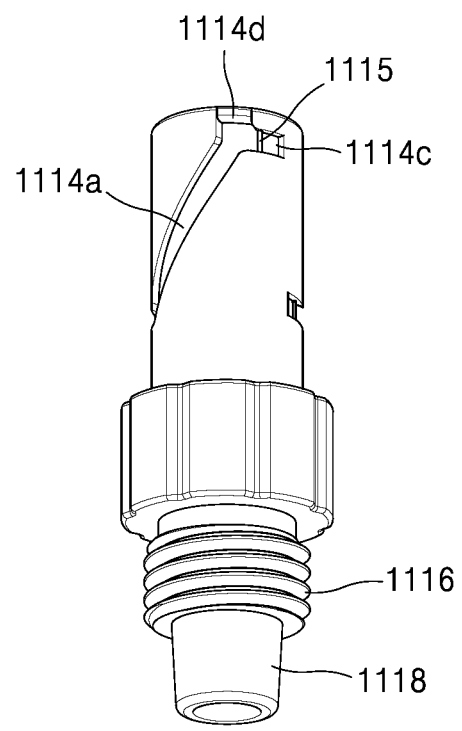

FIG. 8 is a perspective view showing an air injection device according to a second embodiment of the present invention, FIG. 9 is an exploded perspective view showing the air injection device according to the second embodiment of the present invention, FIG. 10 is a sectional view showing the air injection device according to the second embodiment of the present invention, and FIGS. 11a and 11b are perspective views showing a body of the air injection device according to the second embodiment of the present invention.

In the same manner as the air injection device 100 according to the first embodiment of the present invention as mentioned above with reference to FIGS. 1 to 7, an air injection device 1100 according to a second embodiment of the present invention is configured to communicate with the air tube 300 formed on the clothing body 200 and to thus allow air to be injected into or discharged from the air tube 300. In this case, an explanation on the same parts as the air injection device 100 will be avoided, and different parts will be described below.

Referring to FIGS. 8 to 11b, the air injection device 1100 includes a body 1110, an opening and closing part 1120, a connecting part 1130, and an injecting part 1140.

The body 1110 has an air passage 1112 formed therein, and both ends of the body 1110 are connected to the opening and closing part 1120 and the connecting part 1130. The air passage 1112 is open and closed according to a user's control for the opening and closing part 1120.

The body 1110 has a guide groove 1114 concavedly formed on an outer peripheral surface of one end thereof so as to guide the user's control for the opening and closing part 1120. Also, the opening and closing part 1120 has a guide protrusion 1124 protruding from the inner peripheral surface thereof in such a manner as to be inserted into the guide groove 1114.

The guide groove 1114 includes a first guide groove 1114*a* and a second guide groove 1114*b* and a third guide groove 1114*c* that are extended from the first guide groove 1114*a*. For example, the first guide groove 1114*a* is formed on the outer peripheral surface of one end of the body 1110 in an oblique direction from one end of the body 1110 toward the other end of the body 1110, and the second guide groove 1114*b* and the third guide groove 1114*c* are extended from one end and the other end of the first guide groove 1114*a* in a circumferential direction of the body 1110.

In this case, the second guide groove 1114*b* and the third guide groove 1114*c* are extended from both ends of the first guide groove 1114*a* toward the opposite sides to each other. For example, if the first guide groove 1114*a* is formed in an oblique line wherein one end (toward the opening and closing part 1120) is inclined toward a first rotating direction of the opening and closing part 1120, the third guide groove 1114*c* is formed in the first rotating direction from one end of the first guide groove 1114*a*, and the second guide groove 1114*b* is formed in a second rotating direction opposite to the first rotating direction from the other end (toward the connecting part 1130) of the first guide groove 1114*a*.

Accordingly, the air injection device 1100 moves an opening and closing protrusion 1122 just through the rotations of the opening and closing part 1120, thereby opening and closing the air passage 1112, as will be discussed later.

According to the present invention, further, at least one locking protrusion 1115 is formed on at least one region of the second guide groove 1114*b* and the third guide groove 1114*c*, respectively, to limit arbitrary rotations of the opening and closing part 1120.

According to the present invention, further, the guide groove 1114 further includes a fourth guide groove 1114*d* so as to separate the opening and closing part 1120 from the body 1110. For example, the fourth guide groove 1114*d* is extended from a given area of the third guide groove 1114*c* or from one end of the first guide groove 114*a*, from which the third guide groove 1114*c* is extended, toward the opening and closing part 1120. In this case, a limitation projection (whose reference numeral is not shown) is formed on at least a given area of the fourth guide groove 1114*d* to limit the arbitrary escape of the opening and closing part 1120.

The body 1110 has a screw coupling portion 1116 and an insertion portion 1118 formed on one end periphery thereof. The screw coupling portion 1116 is adapted to couple the body 1110 to the connecting part 1130, and the insertion portion 1118 is inserted into the hose H.

The opening and closing part 1120 is adapted to open and close the air passage 1112 of the body 1110 by means of the user's rotating control. To do this, the opening and closing part 1120 has the opening and closing protrusion 1122 protruding from the inner surface of one end thereof toward the body 1110. The opening and closing protrusion 1122 is moved in a longitudinal direction of the body 1110 by means of the user's rotating control and is thus inserted into the air passage 1112 or drawn from the air passage 1112, thereby closing or opening the air passage 1112 of the body 1110. Further, the opening and closing part 1120 has at least one air injection hole 1126 penetratingly formed therein around the opening and closing protrusion 1122.

The connecting part 1130 is coupled to the other end of the body 1110 in such a manner as to allow the air injection device 1100 to communicate with the air tube 300. For example, one end periphery of the hose H connected to the air tube 300 is passed through a through hole 1132 of the connecting part 1130 to allow the insertion portion 1118 of the body 1110 to be fitted to the inside of one end periphery of the hose H, and in this state, if the body 1110 and the connecting part 1130 are screw-coupled to each other by means of a screw coupling portion 1134 formed on the inner peripheral surface of the connecting part 1130 and the screw coupling portion 1116 formed on the body 1110, the inner peripheral surface of the connecting part 1130 pressurizes the outer peripheral surface of the hose H, thereby allowing the hose H to be fixed to the air injection device 1100.

The injecting part 1140 is connected to one end periphery of the opening and closing part 1120 to allow the user's air injection to be more easily carried out. So as to allow the injecting part 1140 to be coupled to the opening and closing part 1120, a coupling protrusion 1142 is formed on one end inner peripheral surface of the injecting part 1140, and a coupling groove 1128 is formed on the outer peripheral surface of the opening and closing part 1120.

If the air passage 1112 is open, the interior of the injecting part 1140 communicates with the air passage 1112, so that air is injected into the air injection device 1100 and the air tube 300 connected to the air injection device 1100 through the injecting part 1140.

According to the present invention, further, the injecting part 1140 includes a mouth portion 1144 formed on the other end thereof. In this case, the mouth portion 1144 has a smaller outer diameter than the opening and closing part 1120. Accordingly, air blows into the air injection device 1100 more easily, in a state where the mouth portion 1144 is fitted to the user's mouth.

The air injection device 1100 as shown in FIGS. 8 to 11*b* is just exemplary, and accordingly, it can be configured freely according to embodiments of the present invention. For example, the connecting part 1120 and the body 1110 are formed integrally with each other, the opening and closing part 1120 and the injecting part 1140 are formed integrally with each other, or at least one of the body 1110, the opening and closing part 1120, the connecting part 1130, and the injecting part 1140 is changed in position.

Figure 12A:
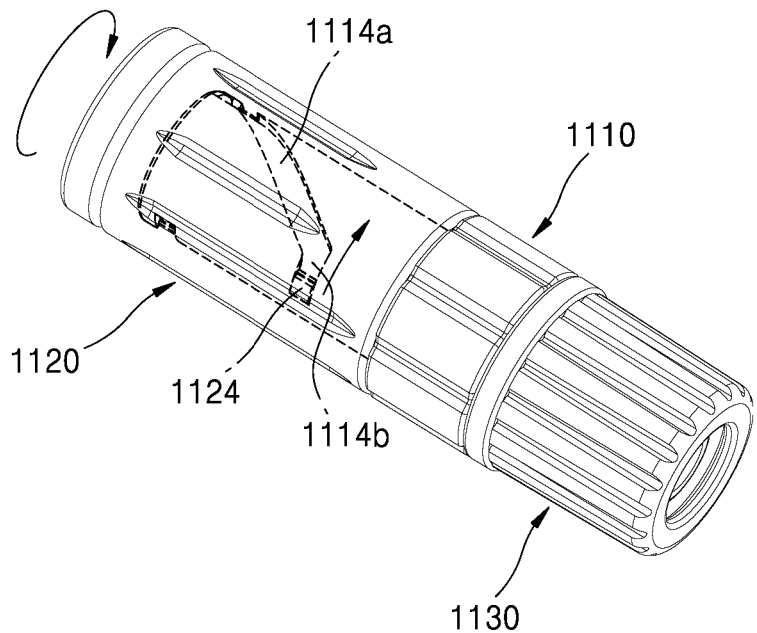
FIGS. 12A to 12C are perspective views showing operating methods of the air injection device according to the second embodiment of the present invention.
Figure 12B:
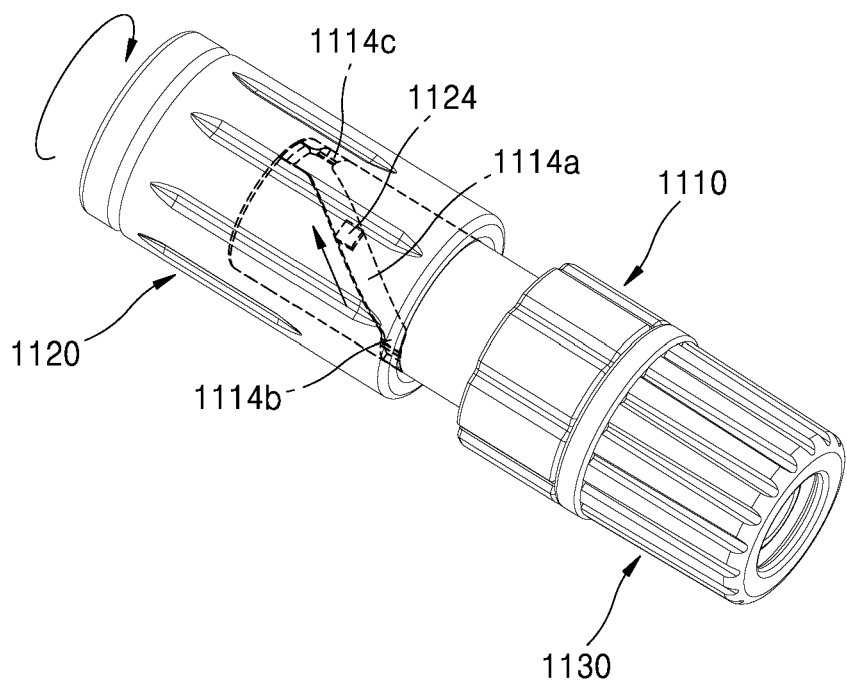
Figure 12C:
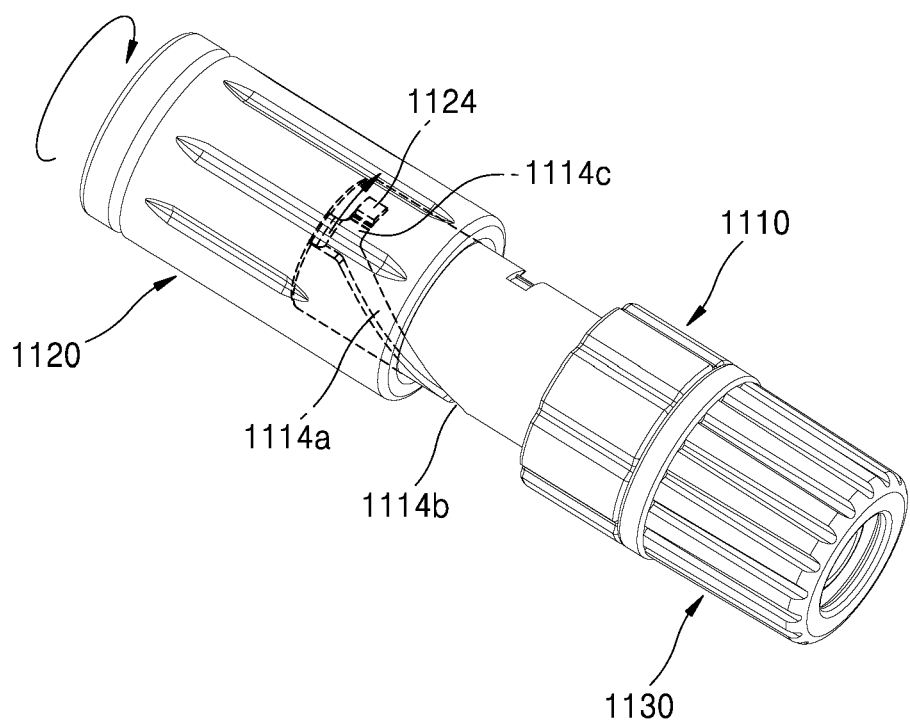

FIGS. 12*a* to 12*c* are perspective views showing operating methods of the air injection device according to the second embodiment of the present invention.

Referring to FIGS. 12*a* to 12*c*, the guide protrusion 1124 is moved along the second guide groove 1114*b*, the first guide groove 1114*a*, and the third guide groove 1114*c*, sequentially through the user's simple control wherein the opening and closing part 1120 rotates in the first rotating direction or in the second rotating direction opposite to the first rotating direction, so that the air passage 1112 can be open or closed.

For example, as shown in FIG. 12*a*, the air injection device 1100 is in a state where the air passage 1112 is closed by means of the opening and closing protrusion 1122. In this case, the guide protrusion 1124 is located on one end of the second guide groove 1114*b* that is formed toward the connecting part 1130.

After that, if a given force from the user is applied to the opening and closing part 1120 in the first rotating direction, the guide protrusion 1124 is moved over the locking protrusion 1115 and is then moved horizontally to the other end of the second guide groove 1114*b* connected to the first guide groove 1114*a*.

If the opening and closing part 1120 is continuously rotated in the first rotating direction, as shown in FIG. 12*b*, the guide protrusion 1124 is moved along the oblique first guide groove 1114*a*, and the opening and closing protrusion 1122 is moved in a direction distant from the body 1110 and is thus drawn from the air passage 1112.

If the opening and closing part 1120 is rotated further in the first rotating direction, as shown in FIG. 12*c*, the guide protrusion 1124 reaches one end of the third guide groove 1114*c*. Next, the guide protrusion 1124 is moved horizontally along the third guide groove 1114*c*, is continuously moved over the locking protrusion 1115, and is fixed to the other end of the third guide groove 1114*c*.

Through the rotating control, the air passage 1112 is open to allow the injecting part 1140 and the opening and closing part 1120 to communicate therewith, and accordingly, air can be injected into the air tube 300 connected to the air injection device 1100.

If the opening and closing part 1120 is rotated in the second rotating direction in the state where the air passage 1112 is open, the guide protrusion 1124 is moved along the third guide groove 1114*c*, the first guide groove 1114*a*, and the second guide groove 1114*b*, sequentially, and accordingly, the opening and closing protrusion 1122 is inserted into the air passage 1112, thereby closing the air passage 1112.

As described above, the present invention has been disclosed with reference to the attached drawings. The terminology used herein is for the purpose of describing particular embodiments only and is not intended to be limiting. While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An air injection device comprising:
   a body having an air passage disposed therein and a guide groove disposed on an outer peripheral surface of one end thereof; and
   an opening and closing part coupled to the one end of the body and having an opening and closing protrusion protruding from an inner surface thereof toward the air passage of the body by a given length and a guide protrusion disposed on an inner peripheral surface thereof, wherein the guide protrusion is configured to be inserted into the guide groove of the body,
   wherein the opening and closing protrusion is configured to open and close the air passage by moving in a first direction toward the body or in a second direction opposite to the first direction, and the movement of the opening and closing protrusion in the first direction or in the second direction is guided by the guide groove of the body and the guide protrusion of the opening and closing part.

2. The air injection device of claim 1, wherein as the opening and closing protrusion is moved in the first direction, at least a portion thereof is inserted into the air passage to close the air passage.

3. The air injection device of claim 1, wherein the opening and closing part comprises at least one air injection hole penetratingly formed on one end periphery thereof around the opening and closing protrusion, and when the opening and closing protrusion is moved in the second direction, the opening and closing protrusion is withdrawn from the air passage to open the air passage and the air passage communicates with an outside through the air injection hole.

4. The air injection device of claim 1, wherein the guide groove comprises:
   a first guide groove disposed in a longitudinal direction of the body; and
   a second guide groove and a third guide groove extended from a first end and a second end of the first guide groove, respectively, in a circumferential direction of the body.

5. The air injection device of claim 4, wherein the guide protrusion is configured to move along the first guide groove to allow the opening and closing protrusion to be moved in the first direction or in the second direction, and when the guide protrusion is located on the first end or the second end of the first guide groove, the guide protrusion is configured to move along the second guide groove or the third guide groove to allow the opening and closing protrusion to be kept in a state of opening or closing the air passage, respectively.

6. The air injection device of claim 4, wherein the first guide groove is disposed on the outer peripheral surface of the one end of the body in an oblique direction from the one end of the body toward an other end of the body, and the second guide groove and the third guide groove extend from the first and second ends of the first guide groove toward the opposite sides to each other, and when the opening and closing part is rotated in a first rotating direction or in a second rotating direction opposite to the first rotating direction, the guide protrusion sequentially moves along the second guide groove, the first guide groove, and the third guide groove to allow the opening and closing protrusion to open or close the air passage.

7. The air injection device of claim 4, wherein the guide groove further comprises a fourth guide groove extended from a given area of the third guide groove or from the second end of the first guide groove from which the third guide groove is extended, and to the fourth guide groove allows the opening and closing part to separate from the body.

8. The air injection device of claim 1, further comprising an injecting part connected to one end of the opening and closing part to allow an interior thereof to communicate with the air passage when the air passage is open, wherein one end of the injecting part on an opposite side to the opening and closing part has a smaller outer diameter than the opening and closing part.

9. The air injection device of claim 1, further comprising a first connecting part coupled to an other end of the body to allow the air injection device to communicate with a hose, the first connecting part comprising:
   a coupling member having a hollow inside and at least a portion thereof is configured to be inserted into the hose to allow the hose to communicate with the air passage; and
   a fixing member spaced apart from an outer peripheral surface of the coupling member to pressurize an outer peripheral surface of the hose coupled to the coupling member through coupling between the first connecting part and the body.

10. The air injection device of claim 9, wherein the body has a first screw thread formed along the inner peripheral surface of the other end thereof, and the fixing member has a second screw thread formed on an outer peripheral surface thereof to be screw-coupled to the first screw thread of the body, and when the first connecting part is rotated in one direction, the fixing member is coupled to the other end of the body to pressurize the outer peripheral surface of the hose.

* * * * *